G. MOTTMILLER.
Corn-Planter.
No. 3,247. Patented Sept. 1, 1843
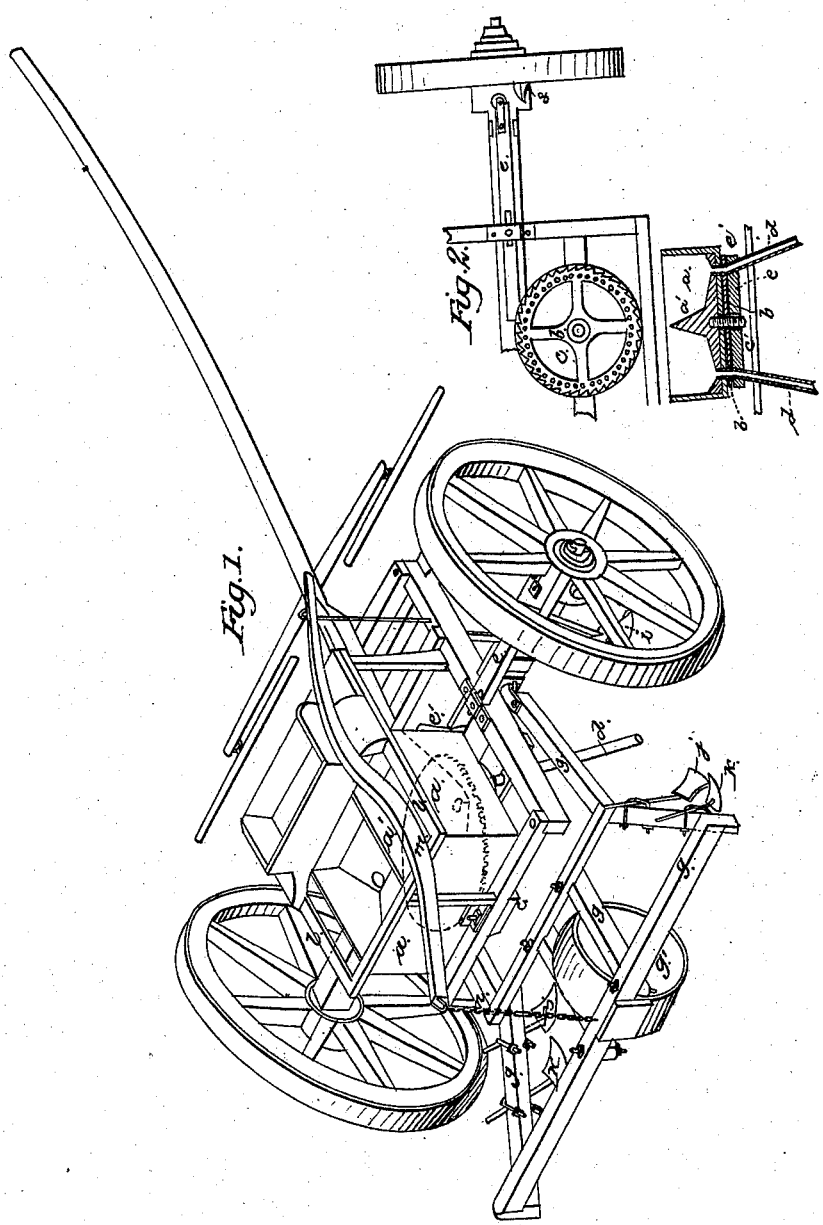

UNITED STATES PATENT OFFICE.

GOTTLIEB MOTTMILLER, OF COLUMBUS, OHIO.

IMPROVEMENT IN SEED-PLANTERS.

Specification forming part of Letters Patent No. 3,247, dated September 1, 1843.

*To all whom it may concern:*

Be it known that I, GOTTLIEB MOTTMILLER, of Columbus, in the county of Franklin and State of Ohio, have invented a new and useful Improvement in the Machinery for Planting Seeds; and I do hereby declare that the following is a full, clear, and exact description thereof, reference being had to the accompanying drawings, which are a part of this specification.

Figure 1 is a perspective view; Fig 2, detached parts.

The nature of my invention consists in constructing a machine that will drop seed at regular intervals, at any distance apart required, and combining therewith shares to open the ground and cover the seed after planting, the frame of said machine being convertible to other uses when required.

To a pair of wheels and axle, of the usual construction of cart-wheels, is attached a square frame having a tongue projecting from it in front, by which the machine is drawn. On the frame, behind the axle, there is a box, $a$, with a partition, $a'$, in it. On each side of this partition the four sides converge inward toward the center, and form two separate hoppers, in the bottom of which there is an oblong hole. Under this hopper a horizontal ratchet-wheel, $b$, (see Fig. 2,) is placed, the rim of which just covers both holes in the hoppers above named. This rim is pierced with holes just the size required to hold the quantity of grain to be dropped at one time. Below the wheel a circular board, $c$, is fastened, from which a stud projects up at the center, on which wheel $b$ revolves. Two holes, $c'$, are made in this board, one just before and the other behind the holes in the hopper, and, as the wheel $b$ turns, each one of the holes in its rim is brought opposite to them in succession and drops the contents, which are received from the hopper through the hole $c'$ and through a pipe, $d$, leading from its under side to the ground. The holes in the wheel are filled from the seed in the hopper, and a brush attached to one side of the hole through the hopper brushes off all the extra seed—a device adopted in many machines now in use.

A rod, $e$, extends along the top of the axle of the carriage from the hub of the wheel on one side to the ratchet-wheel $b$, above described, which works into the teeth of said wheel like a pawl. This rod is forced back against the hub by a spring, $e'$, attached thereto, and it slides in staples driven into the axle or otherwise affixed. The end next the hub bears a friction-roller, that works against the hub as it revolves, the hub being made with one or more cams, $f$, on it, which shove the rod $e$ inward as they come round, the spring throwing it back again, thus moving the wheel $b$ one notch at each time and delivering the seed at proper intervals.

On each side of the seed-box $a$ a common two-winged cultivator-tooth, $i$, is attached by its shank to the axle, at any convenient distance required apart, and a harrow-formed frame, $g$, is connected also with the axle behind by a joint, so as to raise or lower its rear end. This frame has a wheel, $g'$, to support it when down and in operation. To each of its angular sides two single cultivator-teeth, $j$ $k$, the wings of which turn toward each other, are fastened, so as to turn the ground opened by the front double tooth back again, the spout or board $c$ in the mean time delivering the seed into the opened furrows behind the tooth $i$, which seed is covered as the machine passes on.

Above the box $a$ there is a square frame, $l$, supported on three legs—two before and one behind—from the frame below. On this frame $l$ a seat for the driver is placed, and to the hind part a lever, $m$, is jointed, that projects forward on one side of the seat. The rear end of this lever is connected by a chain, $n$, with the frame $g$ behind, and by means of it the device can raise said frame from the ground and catch the end of the lever under a hook, $o$, that reaches up from the front part of frame below.

What I claim as my invention, and desire to secure by Letters Patent, is—

1. The combination of the double hopper $a$ and wheel $b$, so arranged that the one wheel drops two rows, constructed and adjusted in the manner and for the purpose herein described.

2. The frame $g$, jointed to the carriage-axle, combined and arranged as before specified.

G. MOTTMILLER.

Witnesses:
  J. B. PENRIN,
  J. G. WOELFEL.